United States Patent
Desimone et al.

(10) Patent No.: US 8,867,237 B2
(45) Date of Patent: Oct. 21, 2014

(54) CONTROL DEVICE OF THE SWITCHING FREQUENCY OF A QUASI-RESONANT SWITCHING CONVERTER AND RELATED CONTROL METHOD

(75) Inventors: Silvio Desimone, Busto Arsizio (IT); Claudio Adragna, Monza (IT)

(73) Assignee: STMicroelectronics S.r.l., Agrate Brianza (IT)

( * ) Notice: Subject to any disclaimer, the term of this patent is extended or adjusted under 35 U.S.C. 154(b) by 10 days.

(21) Appl. No.: 13/433,083

(22) Filed: Mar. 28, 2012

(65) Prior Publication Data

US 2012/0250367 A1    Oct. 4, 2012

(30) Foreign Application Priority Data

Apr. 4, 2011    (IT) .............................. MI2011A0546

(51) Int. Cl.
*H02M 3/335* (2006.01)
*H02M 1/44* (2007.01)
*H02M 3/338* (2006.01)
*H02M 1/00* (2006.01)

(52) U.S. Cl.
CPC .......... *H02M 3/3381* (2013.01); *Y02B 70/1433* (2013.01); *H02M 1/44* (2013.01); *H02M 2001/0058* (2013.01); *Y02B 70/1441* (2013.01)
USPC ..................................... 363/21.08; 363/21.05

(58) Field of Classification Search
USPC ..................... 363/21.02–21.05, 21.08–21.13, 363/21.16–21.18, 97
See application file for complete search history.

(56) References Cited

U.S. PATENT DOCUMENTS

| | | | |
|---|---|---|---|
| 4,672,518 A * | 6/1987 | Murdock | 363/21.04 |
| 6,138,042 A * | 10/2000 | Midya et al. | 363/97 |
| 6,411,531 B1 * | 6/2002 | Nork et al. | 363/60 |
| 7,502,236 B2 * | 3/2009 | Baurle et al. | 363/21.16 |
| 7,616,454 B2 * | 11/2009 | Yang | 363/21.04 |
| 7,746,671 B2 * | 6/2010 | Radecker et al. | 363/21.03 |
| 2009/0237058 A1 * | 9/2009 | Mulligan et al. | 323/288 |
| 2010/0289466 A1 | 11/2010 | Telefus | |
| 2010/0315838 A1 | 12/2010 | Mao et al. | |
| 2011/0019441 A1 * | 1/2011 | Djenguerian et al. | 363/21.17 |
| 2011/0204988 A1 * | 8/2011 | Prodic et al. | 332/110 |

OTHER PUBLICATIONS

Chang et al., "On Randomized Harmonic Spectrum Control for a Flyback Switch-Mode Rectifier," International Conference on Power Electronics and Drive Systems, 2009 (PEDS 2009), Taipei, Nov. 2-5, 2009, pp. 28-23.

* cited by examiner

*Primary Examiner* — Gary L Laxton
*Assistant Examiner* — Alex Torres-Rivera
(74) *Attorney, Agent, or Firm* — Seed IP Law Group PLLC

(57) ABSTRACT

A control device for a QR switching power converter is described; said power converter is adapted to convert an input signal to a DC output signal and comprises a power switch connected to said input signal and adapted to regulate said DC output signal and magnetic storage means. The control device is able to determine the switching frequency of the power switch and it is supplied by a feedback signal deriving from a feedback circuit coupled to the output signal of the power converter; said control device performs a control loop regulating the DC output signal by controlling a control variable. The control device comprises modulating means adapted to modulate said control variable as a function of at least one modulating signal having a frequency higher than the control loop bandwidth.

29 Claims, 16 Drawing Sheets

CONTROL DEVICE OF THE SWITCHING FREQUENCY OF A QUASI-RESONANT SWITCHING CONVERTER AND RELATED CONTROL METHOD

BACKGROUND

1. Technical Field

The present disclosure relates to a control device for controlling a switching frequency of a quasi-resonant switching converter and a related control method.

2. Description of the Related Art

Switch-mode power supplies are affected by electromagnetic interference (EMI). EMI noise is generated when voltage and current are modulated by the switching converter comprised in the supply and this electrical noise can be transferred to the ac power line.

EMI noise affects the operation of some electronic systems by conduction; also, EMI induced noise on a power line may radiate or leak from the power line and affect other electronic equipment. Both conducted and radiated electrical noise may adversely affect or interfere with the operation of the electronic devices.

To address EMI related issues, regulations exist that define the maximum amount of EMI that can be produced by various classes of electronic devices and, in particular, by power supplies. Therefore, an important step in the design of a power supply is to keep EMI emissions within the limits specified by the applicable regulations.

EMI may be controlled in power supplies by adding input filters and snubbing the edges of the current and/or voltage switching waveforms. The extra components required to perform these tasks can undesirably increase the size and weight of the power supply. Further, they usually complicate the design process and increase the production cost: noise filtering components increase the cost and are often added on a trial-and-error basis during the final design process when EMI is found to exceed the compliance limits.

Frequency modulation (or jittering, or dithering as sometimes it is termed) is a technique that can facilitate the compliance of a switch-mode power supply with EMI emission regulations. In fact, on the one hand the emission of a switching converter is concentrated at the switching frequency and its higher-order harmonics. On the other hand, the EMI regulations envisage limits for the peak energy at any given harmonic, not for the total emitted energy. By modulating the switching frequency many side-bands are performed and the emission spectrum is scattered around these bands: this reduces the peak amplitude of the harmonics and makes it easier for them to stay below the EMI emission limits.

Normally, this technique is applied to power supplies in which the operating frequency of the switching converter is determined by an oscillator. Varying the oscillator frequency according to a given time profile will modulate the operating frequency of the switching converter and perform the above described spread-spectrum action on its EMI emission. This is extensively treated in the patent literature as well as the scientific literature.

Other types of switching converter exist where switching frequency is not determined by an oscillator. Examples of these converters are the old-fashioned ringing-choke converter (RCC) and the current transition-mode (TM) boost power factor corrector (PFC) pre-regulator and the quasi-resonant (QR) flyback converter. In these, the turn-on of the power switch is synchronized to the demagnetization of their magnetic storage device (inductor or transformer) and not by a clock signal provided by an oscillator. As a result, their switching frequency depends on the input voltage, the output load and the inductance associated with the magnetic device.

The dependence of the switching frequency on the input voltage provides these converters with a natural switching frequency modulation at twice the line frequency.

This is quite obvious in TM boost PFC pre-regulators, which operate directly from the rectified line voltage, so that their input voltage changes all the way from zero to the peak and then again to zero in a line half-cycle.

In QR flyback converters, as in most non-power-factor-corrected converters operated off the power line, the front-end stage is made up of a full wave rectifier bridge with a downstream capacitor filter, which provides an unregulated dc bus from the ac line. The filter capacitor is normally large enough to have a relatively low ripple at twice the line frequency, superimposed on the dc level. This ripple modulates the switching frequency at twice the line frequency with a depth depending on its amplitude.

This natural modulation at twice the line frequency provides an actual benefit in terms of EMI reduction, especially with the average (AV) detection method. Unfortunately, the effect is strongly dependent not only on the input voltage but also on the output power, which affect both the frequency deviation in a line half-cycle and the center frequency. As a general trend, the natural frequency modulation tends to reduce as the input voltage increases and/or the output load decreases. Additional, this low-frequency modulation is not very effective with the quasi-peak (QP) detection method.

In this class of converters, EMI reduction by frequency modulation can be improved by superimposing a higher-frequency forced modulation onto the low-frequency natural one; this provides a significant benefit also with QP detection.

BRIEF SUMMARY

One embodiment of the present disclosure is to provide a control device for the switching frequency of a quasi-resonant switching converter which is different from the known ones.

One embodiment of the present is a control device for controlling a quasi-resonant switching power converter configured to convert an input signal to a DC output signal. The power converter includes a power switch, connected to said input signal and adapted to regulate said DC output signal, and a magnetic storage element. The control device is configured to determine the switching frequency of the power switch as a function of the demagnetization of said magnetic storage element. The control device is supplied by a feedback signal deriving from a feedback circuit coupled to the output signal of the power converter. The control device performs a control loop regulating the DC output signal by controlling a control variable and includes a modulator configured to modulate said control variable as a function of at least one modulating signal having a frequency higher than the control loop bandwidth.

BRIEF DESCRIPTION OF THE SEVERAL VIEWS OF THE DRAWINGS

The features and advantages of the present disclosure will become apparent from the following detailed description of some embodiments thereof, illustrated only by way of non-limitative examples in the annexed drawings, in which.

DETAILED DESCRIPTION

Figure 1:
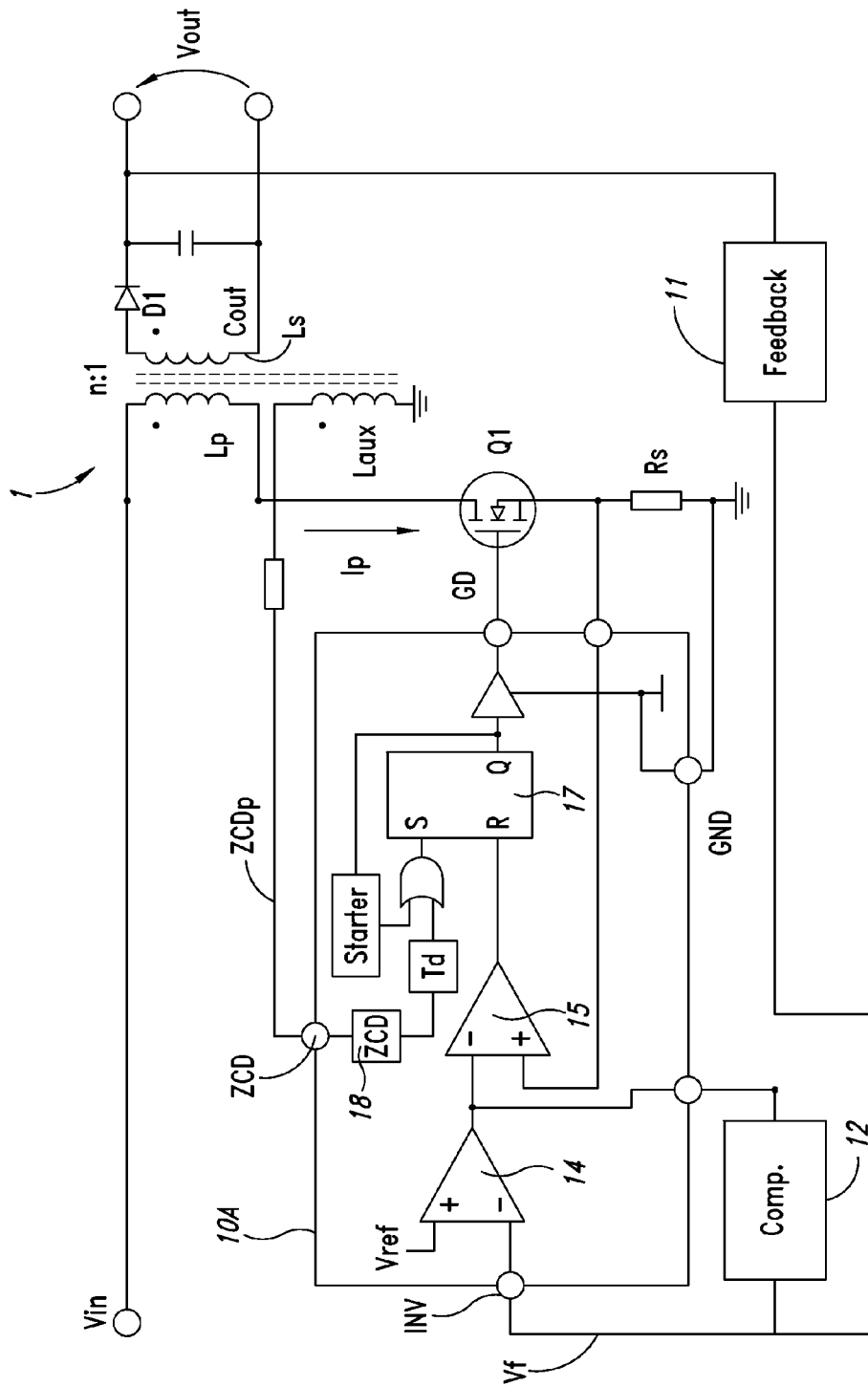
FIG. 1 shows the principle schematic of a current-mode controlled quasi-resonant (QR) flyback converter.

FIG. 1 shows a current-mode controlled quasi-resonant (QR) flyback converter according to prior art. The converter comprises a transformer 1 with a primary winding Lp and a secondary winding Ls; the primary winding Lp is coupled with the instantaneous DC input signal Vin and with the power switch Q1 connected to ground GND by means of a sense resistance Rs passed through by a current Ip. The secondary winding Ls is connected to a diode D1 and a capacitor Cout arranged in series between the terminals of the secondary winding Ls; the output voltage Vout is the voltage across the capacitor Cout. An integrated control device 10A for controlling the power switch Q1 has a pin INV that receives a signal Vf representative of the output Vout through an isolated feedback 11. The control device 10A comprises an error amplifier 14 adapted to amplify the error voltage between a signal representative of the output voltage Vout with a reference voltage Vref; and a compensation network, configured to compensate for the error amplifier 14 is coupled with the pin INV and the output of the error amplifier 14. The control device 10A comprises a PWM comparator 15 adapted to compare the output signal of the error amplifier with a signal across the sense resistance Rs. The output signal of the PWM comparator is the reset signal R of a flip-flop set-reset 17 the set signal of which is the output signal of a zero current detector (ZCD) 18 coupled with an auxiliary winding Laux at the pin ZCD. The output signal Q of the flip-flop set-reset 17 is the control signal of the switch Q1. The power switch Q1 is turned on as a function of the demagnetization of the magnetic storage device of the converter, in this case the transformer 1. Particularly the turn on of the power switch Q1 is synchronized to said demagnetization and not by a clock signal provided by an oscillator.

Figure 2:
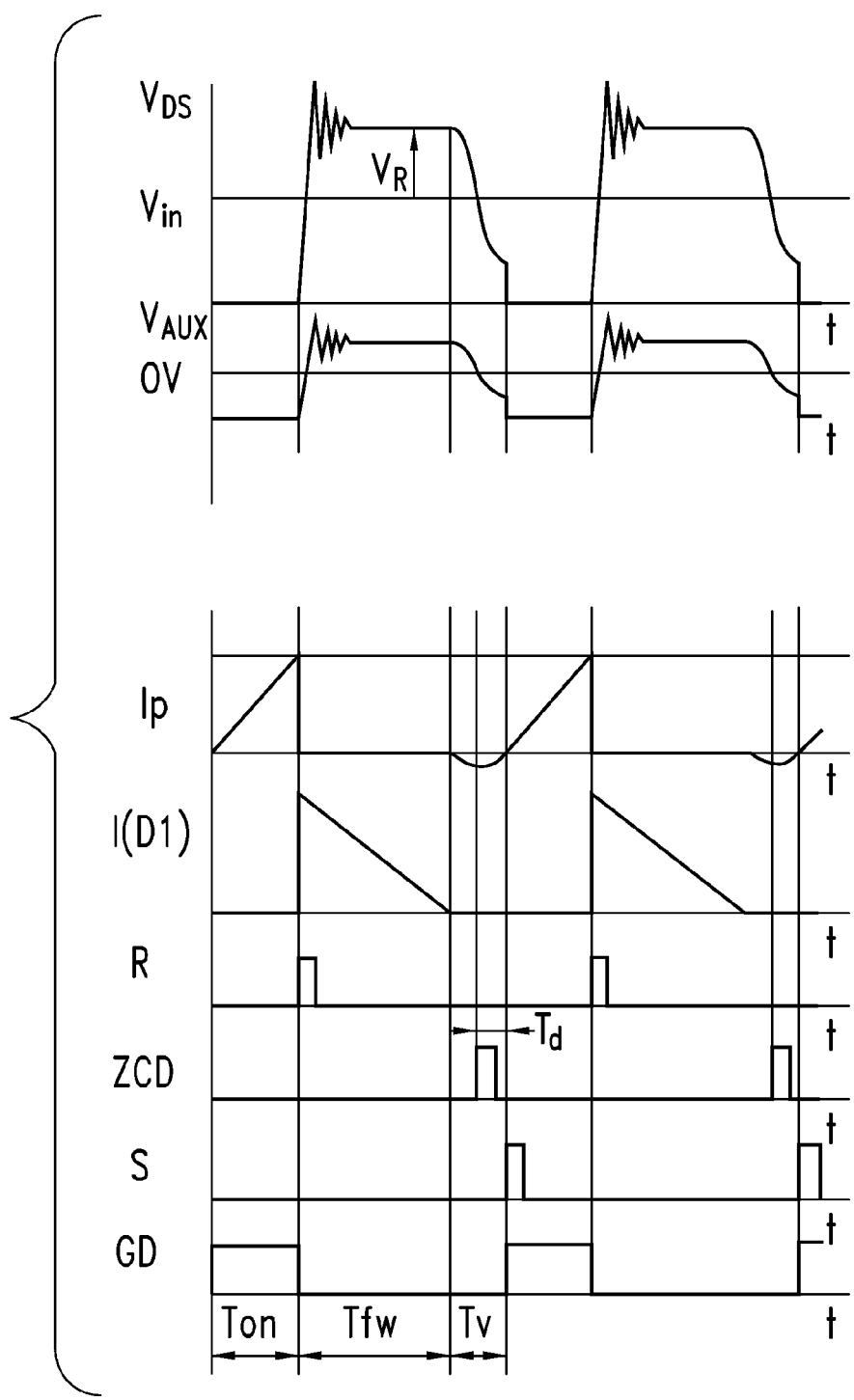
FIG. 2 is a time diagram of some signals in play in the converter of FIG. 1.

The switching period Tsw of the converter in FIG. 1 can be divided into three subintervals: the ON-time of the power switch Q1 (Ton), the recirculation time of the secondary rectifier D1 (Tfw), i.e., the time needed for the transformer 1 to demagnetize, and the delay time Tv that elapses from transformer demagnetization (i.e., the instant when the current through D1 falls to zero) to the next turn-on of the power switch, as shown in FIG. 2. This time is normally fixed at half the period of the transformer voltage ringing that follows demagnetization, so that turn-on occurs with minimum voltage across the switch Q1 (valley switching). It is possible to write:

$$Tsw = Ton + Tfw + Tv, \text{ with: } Ton = \frac{LpIpkp}{Vin};$$

$$Tfw = \frac{LpIpkp}{Vr} = Ton\frac{Vin}{Vr} \text{ and therefore:}$$

$$Tsw = Ton\left(1 + \frac{Vin}{Vr}\right) + Tv = \frac{LpIpkp}{Vin}\left(1 + \frac{Vin}{Vr}\right) + Tv,$$

wherein Lp is the transformer primary inductance, Ipkp the peak primary current reached at the end of Ton, Vin the instantaneous DC input voltage (whose ripple is responsible for the natural modulation of Ton, Tfw and, therefore, Tsw) and Vr the converter output voltage reflected back to the primary side during Tfw. The duration of Ton is determined by the primary inductor current reaching the value Ipkp programmed by the outer control loop that regulates the output voltage. The programmed Ipkp value is such that the converter delivers exactly the power demanded by the load. FIG. 2 shows the time diagrams of the signals in play in the QR flyback converter of FIG. 1, that is the signals Vin, $V_{DS}$ (the drain-source voltage of the MOSFET power transistor Q), $V_{AUX}$ (the voltage across the inductor Laux), I(D1) the current flowing through D1, S, R, Ip, the signal GD which controls the switch Q and the signal ZCDp representative of the zero current detection.

Figure 3:
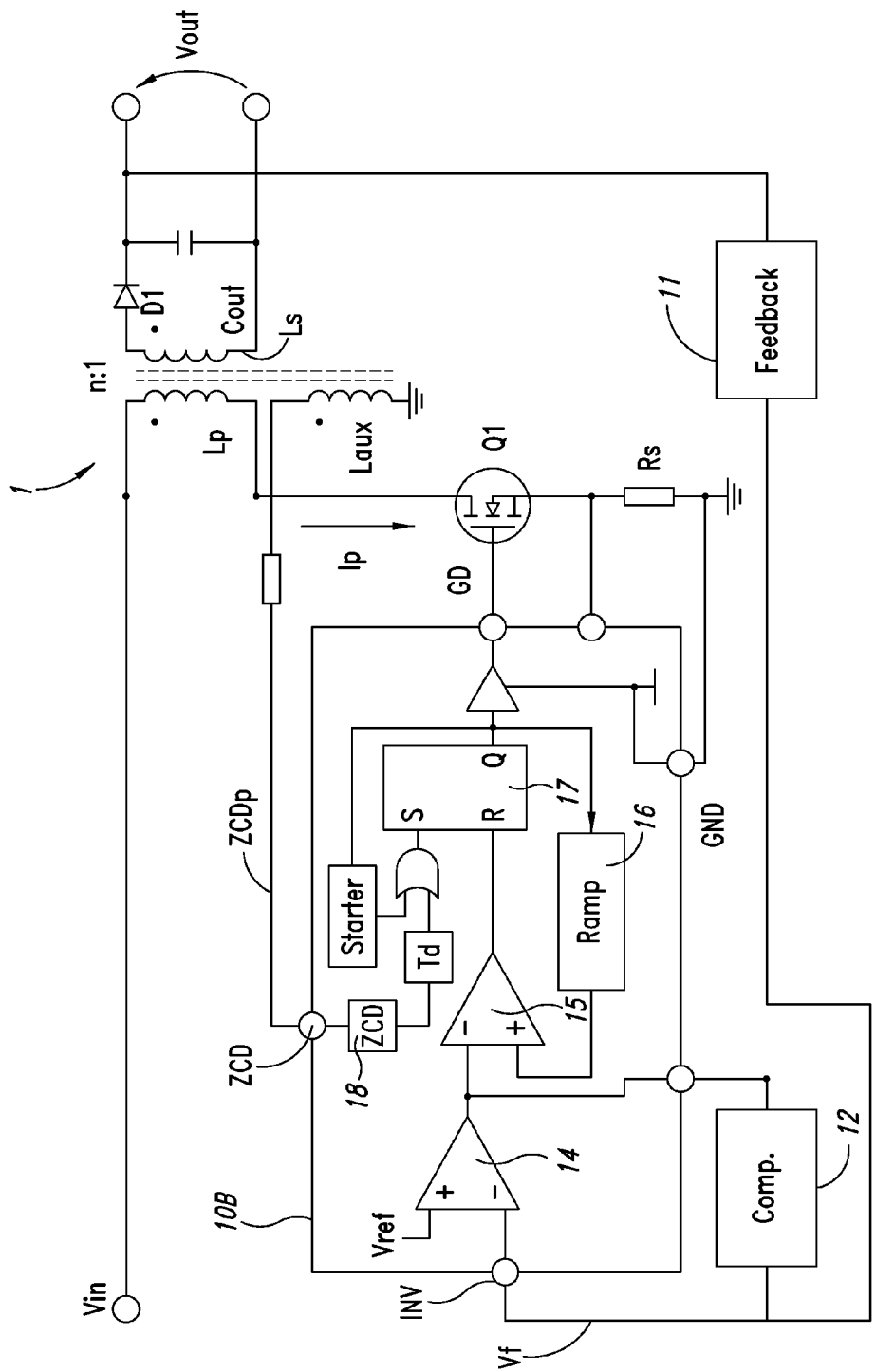
FIG. 3 shows the principle schematic of a voltage-mode controlled quasi-resonant (QR) flyback converter.
Figure 4:
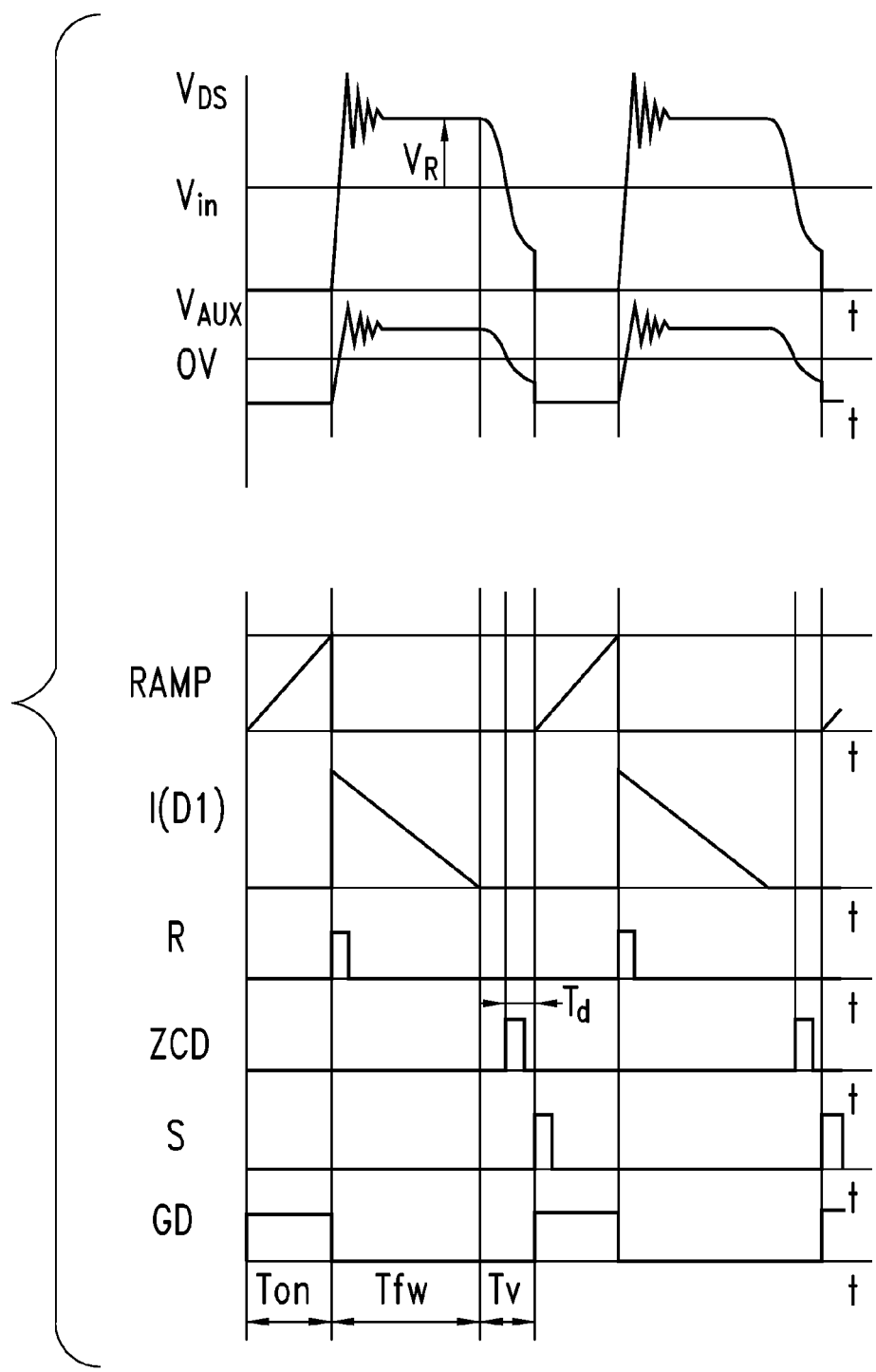
FIG. 4 is a time diagram of some signals in play in the converter of FIG. 3.

The QR flyback converter can be controlled in voltage-mode, as shown in FIG. 3. In this case the control device 10B comprises a ramp generator 16 for generating the ramp signal RAMP and a PWM comparator 15 adapted to compare the ramp signal RAMP with the output signal from the error amplifier 14; also the time Ton is directly adjusted by the closed-loop control system that regulates the output voltage. The resulting dynamic behavior is different but the steady-state equations governing the operation are the same as with current-mode, thus the above equations apply to voltage-mode controlled QR flyback converters as well. FIG. 4 shows the time diagrams of some signal in play in the QR flyback converter of FIG. 3, that is the signals Vin, $V_{DS}$ (the drain-source voltage of the MOSFET power transistor Q), $V_{AUX}$ (the voltage across the inductor Laux), I(D1) the current flowing through D1, S, R, the ramp voltage RAMP, the signal GD which controls the switch Q and the signal ZCDp representative of the zero-crossing detection.

Figure 5:
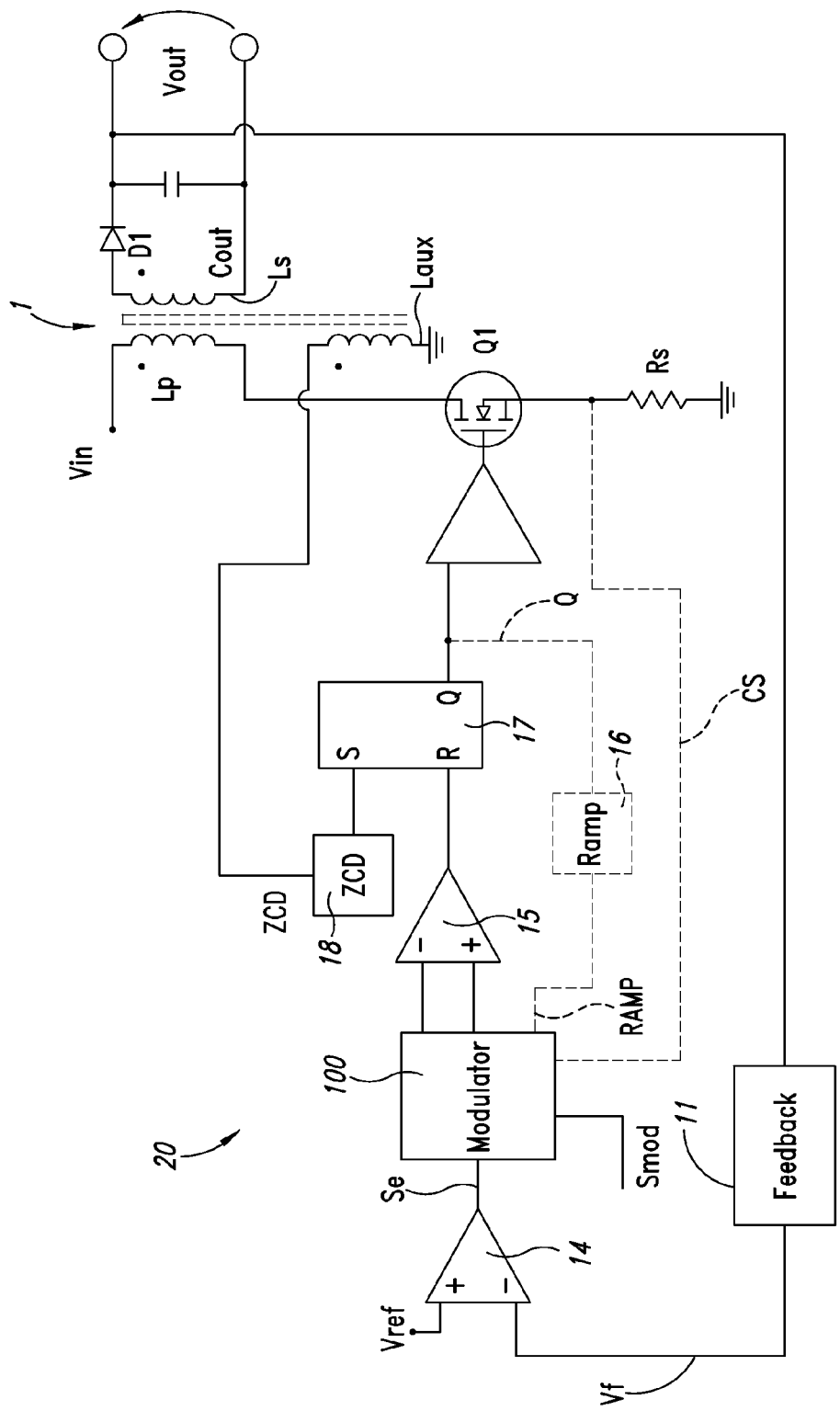
FIG. 5 shows a quasi-resonant flyback converter with a control device according to the present disclosure.

In accordance with the present disclosure, the control device 20 of a QR switching converter comprises a modulator 100 configured to modulate the control variable Ton or Ipkp of the control loop of the output signal Vout as a function of at least one modulating signal Smod having a frequency fmod higher than the control loop bandwidth fb, as shown in FIG. 5. For example, the control loop bandwidth fb ranges from 0.1 kHz to 5 kHz; and if the control loop bandwidth fb is 1 kHz, the frequency of the modulating signal is equal to 10 kHz.

The QR converter in FIG. 5, preferably a QR flyback converter, comprises a transformer 1 with a primary winding Lp and a secondary winding Ls. The primary winding Lp is coupled with the instantaneous DC input signal Vin and with the power switch Q1 connected to ground GND by a sense resistance Rs passed through by a current Ip. The secondary winding Ls is connected to a diode D1 and a capacitor Cout arranged between the terminals of the secondary winding Ls; the output voltage Vout is the voltage across the capacitor Cout. The control device 20 for controlling the power switch Q1, preferably an integrated control device, has an input coupled to receive a signal Vf representative of the output Vout through an isolated feedback element 11, such as an optocoupler. The control device 20 comprises an element 14 adapted to output an error voltage Se between a voltage Vf representative of the output voltage Vout with a reference voltage Vref. The element 14 preferably is an error amplifier 14 having an inverting input that receives the voltage Vf and a non-inverting input that receives the reference voltage Vref. The modulator 100 is configured to receive the voltage Se and the voltage CS across the sense resistance Rs in the case of a current-mode controlled QR flyback converter or with a ramp signal RAMP generated by a ramp generator 16 in the case of a voltage-mode controlled QR flyback converter. The modulator 100 has a control input that receives the modulating signal Smod and outputs signals to the inverting and non-inverting inputs of a PWM comparator 15. The output signal of the PWM comparator 15 is the reset signal R of a flip-flop set-reset 17 the signal set S of which is the output signal of a zero current detector (ZCD) 18 coupled with an auxiliary winding Laux at the pin ZCD. The output signal Q of the flip-flop set-reset 17 is a control signal that is provided by a driver D to the switch Q1. The switching frequency of the power switch Q1 is fixed by the demagnetization of the magnetic storage device of the converter, in this case the transformer 1, and by the feedback loop. Particularly the turn on of the power switch Q1 is synchronized to said demagnetization and not by a clock signal provided by an oscillator.

The switching period Tsw of the converter is divided into three subintervals: the ON-time of the power switch Q1 (Ton), the recirculation time of the secondary rectifier D1 (Tfw), i.e., the time for the transformer to demagnetize, and the delay time Tv that elapses from transformer demagnetization (i.e., the instant when the current through D1 falls to zero) to the next turn-on of the power switch.

In FIG. 5 particularly the modulator 100 modulates one between the input signals of the PWM comparator 15 of the QR switching converter, preferably a QR flyback converter, which may be controlled in current or voltage mode.

For example, in the case of a QR flyback converter controlled in voltage-mode, the modulator 100 modulates directly the time period Ton by changing periodically the slope of the PWM voltage ramp or by adding a time-varying signal to the control voltage.

For example, in the case of a current-mode controlled QR flyback converter the modulator 100 modulates directly the current Ipkp by adding a time-varying signal to the peak current programming value given by the voltage control loop, or by adding the time-varying signal to the current sensing input, or by periodically changing the gain of the current sensing input.

Figure 6B:
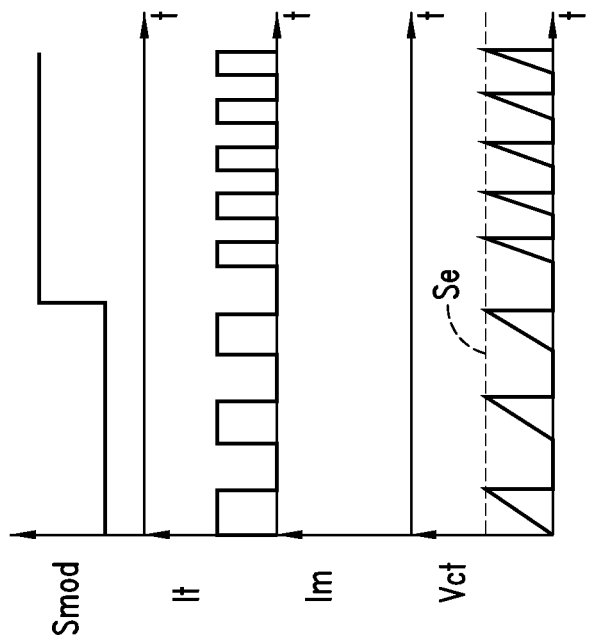
FIG. 6 shows a control device of the switching frequency of a switching converter according to a first embodiment of the present disclosure along with the time diagram of some signals in play in the control device.
Figure 6A:
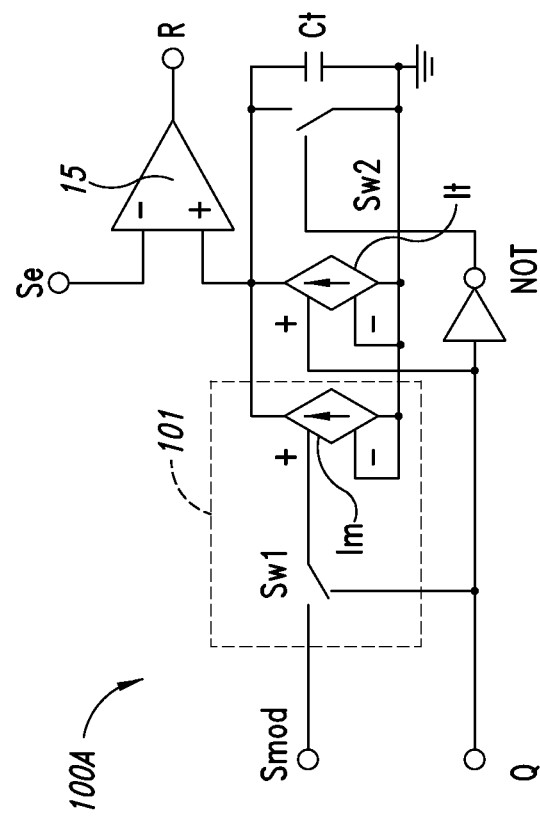

FIG. 6A shows a circuit scheme of a modulator 100A adapted to operate a direct modulation of the time period Ton by changing the slope of the PWM ramp according to a first embodiment of the present disclosure.

The modulator 100A includes a modulation unit 101 that includes a switch SW1 and a voltage-controlled current generator Im.

The part external to the modulation unit 101 is a prior art ramp generator that operates by charging a timing capacitor Ct with the current generator It. This generator It is active only when the Q output of the flip-flop 17 is high, i.e., when the power switch Q1 is on. During this period the switch SW2 is open; the switch SW2 is controlled by a NOT signal Q (the output signal of a NOT gate having at input the signal Q). The voltage Vct developed across the capacitor Ct is fed to the non-inverting input of the PWM comparator 15, which receives at its inverting input the output voltage of the error amplifier 14.

As the voltage across the capacitor Ct reaches the level of the output Se of the error amplifier 14, the output R of the PWM comparator 15 goes high and resets the PWM latch or flip-flop 17. The output signal Q of the flip-flop 17 goes low and the power switch Q1 is turned off, thus determining the duration of the time period Ton. The current source It is turned off too and the switch SW2 is closed, thus resetting the capacitor Ct.

The voltage-controlled current generator Im adds a current to the current provided by the current generator It to charge the capacitor Ct. Also this generator Im is enabled only during the time period Ton, during which it is connected by the switch SW1 to an input that receives the modulating signal Smod, thus sourcing a current proportional to the signal Smod.

The addition of the current from the current generator Im modifies the rate of change of the voltage across Ct, so that the time to reach the output level of the error amplifier 14 (i.e., Ton) is modified too. As a result, the time period Toff will be changed accordingly and so will be the time switching period Tsw. The time diagrams in FIG. 6B show this operation through some waveforms of the signal It, Im and Vct (the voltage across the capacitor Ct) in the exemplary case of a square wave modulating signal Smod. Of course, nothing prevents from using different shapes.

Figure 7B:
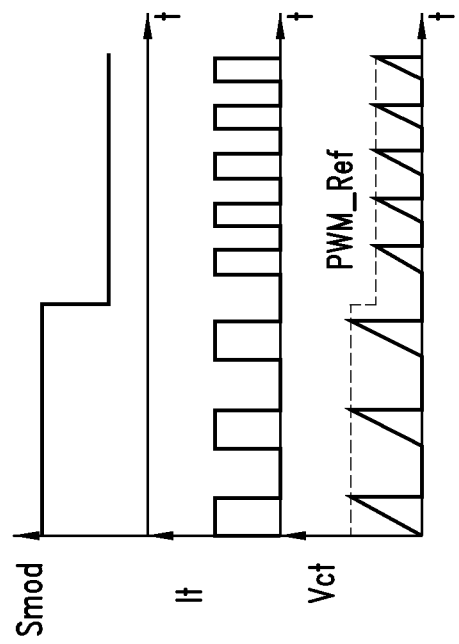
FIG. 7 shows a control device of the switching frequency of a switching converter according to a variant of the first embodiment of the present disclosure along with the time diagram of some signals in play in the control device.

Alternatively, in a modulator 100B according to a variant of the first embodiment of the present disclosure, the time period Ton can be directly modulated by adding a time-varying signal to the control voltage as illustrated in FIG. 7.

The same ramp generator (generator It, switch Sw2, NOT gate) considered in the previous case is connected to the non-inverting input of the PWM comparator 15. Its inverting input is connected to the signal PWM_Ref, which is output by an analog summer Σ. The inputs to the summer Σ are the signal Se output by the error amplifier 14 and the modulating signal Smod. Comparing the ramp Vct (which, in this case, has a fixed slope) to a time-varying reference voltage PWM_Ref will change the duration of the ramp, i.e., Ton, accordingly. This is shown in the timing diagrams in FIG. 7B for the exemplary case of wherein the signal Smod is a square wave modulating signal.

Figure 7A:
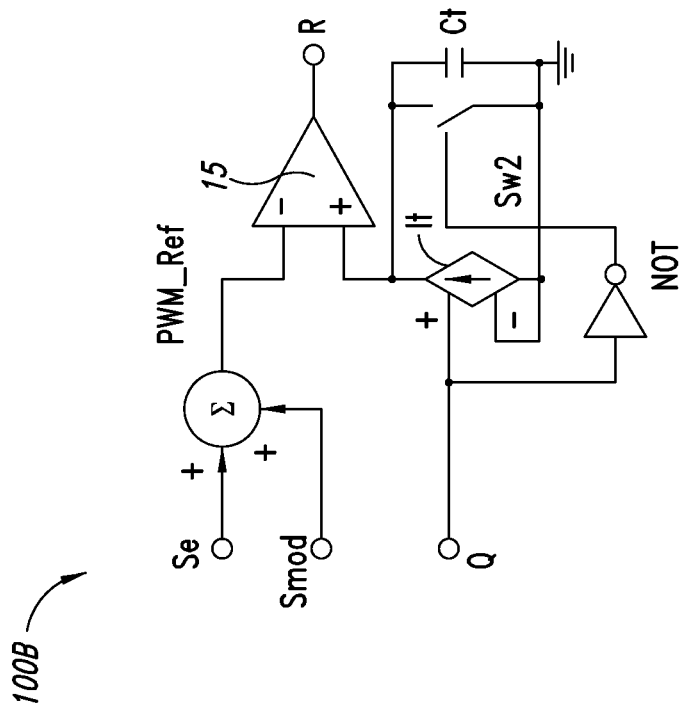

In the present case the ramp Vct used in FIGS. 6A and 7A determines only the duration of the ON-time period Ton of the power switch and exists only during this time. The switching frequency is determined by other mechanisms, in our case by the time needed for the transformer to dump the energy accumulated during the ON-time. The ramp generator, therefore, is to be regarded not as an oscillator but as a time-to-voltage converter.

Figure 8B:
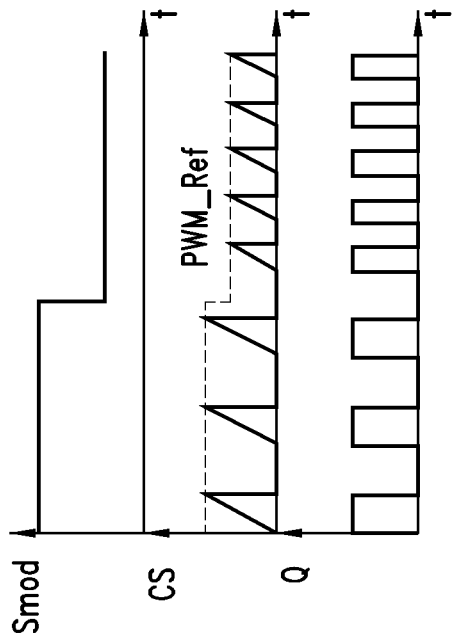
FIG. 8 shows a control device of the switching frequency of a switching converter according to a second embodiment of the present disclosure along with the time diagram of some signals in play in the control device.
Figure 8A:
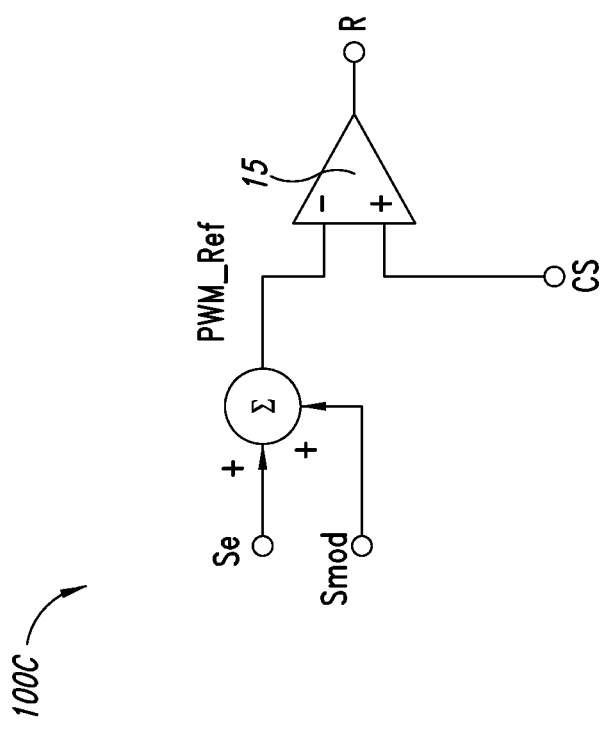

The same concept used in the circuit in FIG. 7A can be used to implement frequency modulation using a modulator 100C in the current-mode controlled quasi-resonant converter as illustrated in FIG. 8A, according to a second embodiment of the present disclosure.

The PWM comparator 15 receives the signal CS, which is an image of the current Ip as a voltage drop across the sensing resistor Rs, at its non-inverting input. During the ON-time of the power switch Q1 the primary current rises linearly with a slope equal to Vin/Lp and so does the voltage CS across Rs. The inverting input of the PWM comparator is connected to the signal PWM_Ref, the output signal of the analog summer E. The inputs to the summer Σ are the signal Se in output from the error amplifier 14 and the modulating signal Smod.

As the voltage CS equals PWM_Ref the output signal R of the PWM comparator goes high and resets the PWM latch. Its output Q goes low, the power switch Q1 is turned off and the signal CS goes to zero. This determines the peak inductor current Ipkp=PWM_Ref/Rs and the duration of the time period Ton expressed by $$Ton = \frac{LpIpkp}{Vin}.$$

The inputs to the summer E are the output voltage of the error amplifier E/A and the modulating signal Smod, so PWM_Ref will be a time-varying voltage. Comparing the ramp CS with the time-varying reference voltage PWM_Ref will change the duration of the ramp, i.e., for example the time period Ton, accordingly. The time periods Tfw and the switching time Tsw will change too, as expressed in:

$$Tfw = \frac{LpIpkp}{Vr} = Ton\frac{Vin}{Vr} \text{ and}$$

$$Tsw = Ton\left(1 + \frac{Vin}{Vr}\right) + Tv = \frac{LpIpkp}{Vin}\left(1 + \frac{Vin}{Vr}\right) + Tv.$$

This is shown in the timing diagrams in FIG. 8B for the exemplary case wherein Smod is a square wave modulating signal.

Figure 9B:
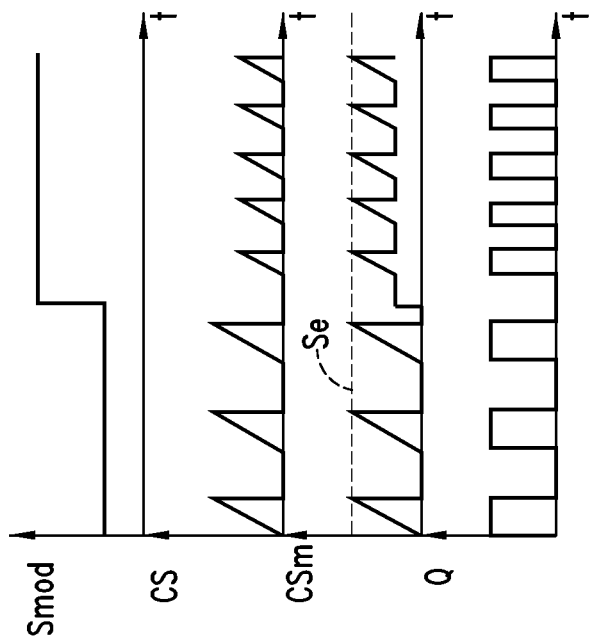
FIG. 9 shows a control device of the switching frequency of a switching converter according to a variant of a second embodiment of the present disclosure along with the time diagram of some signals in play in the control device.
Figure 9A:
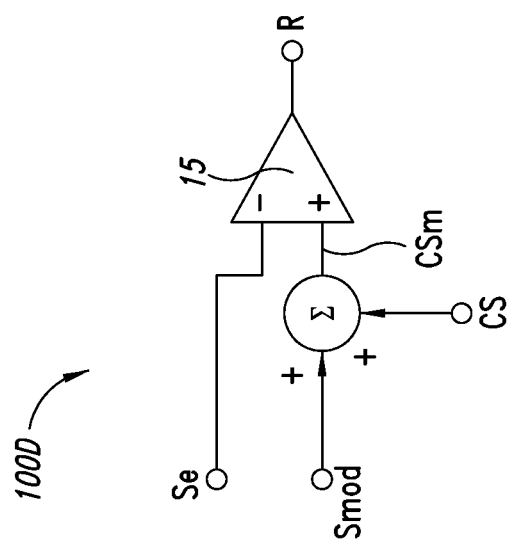

Alternatively, in a modulator 100D according to a variant of the second embodiment of the present disclosure, the modulating signal Smod is added to the signal CS instead of the signal Se, as shown in FIG. 9A. The analog summer Σ receives the signal CS and the modulating signal Se on its inputs and delivers the output CSm to the non-inverting input of the PWM comparator 15. The inverting input is connected to the signal Se.

As shown in the time diagrams of the signals Smod, CS, CSm and Q in FIG. 9B, for the exemplary case wherein Smod is a square wave modulating signal, the signal CS is offset by the modulating signal so that the time for the signal CSm to reach the signal Se (i.e., for the peak current to reach the programmed value Ipkp) changes accordingly.

Preferably in all the devices according to the first and second embodiments of the disclosure, the amplitude of the modulating signal Smod should be adjusted proportionally to the level of the signal Se. In this way the amount of modulation would be higher at heavy load (when the level of the signal Se is high) and smaller at light load (when the level of the signal Se is low).

Figure 10B:
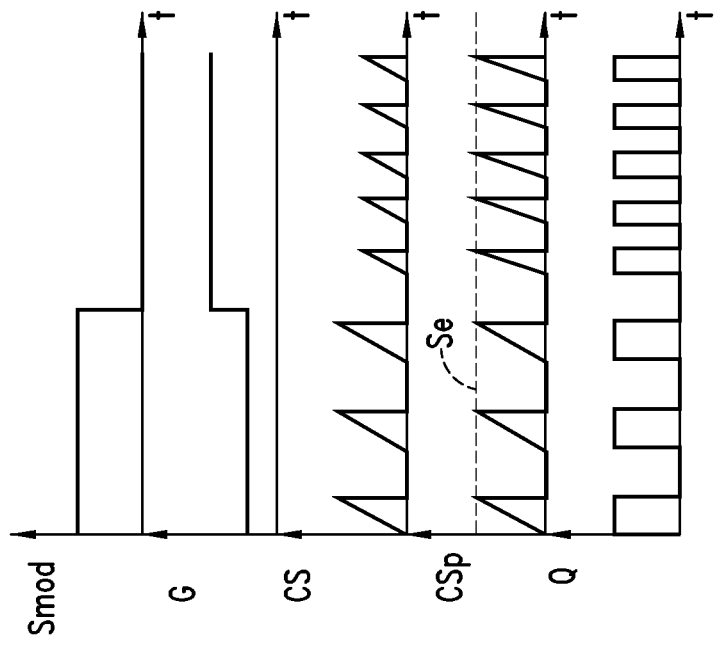
FIG. 10 shows a control device of the switching frequency of a switching converter according to a third embodiment of the present disclosure along with the time diagram of some signals in play in the control device.
Figure 10A:
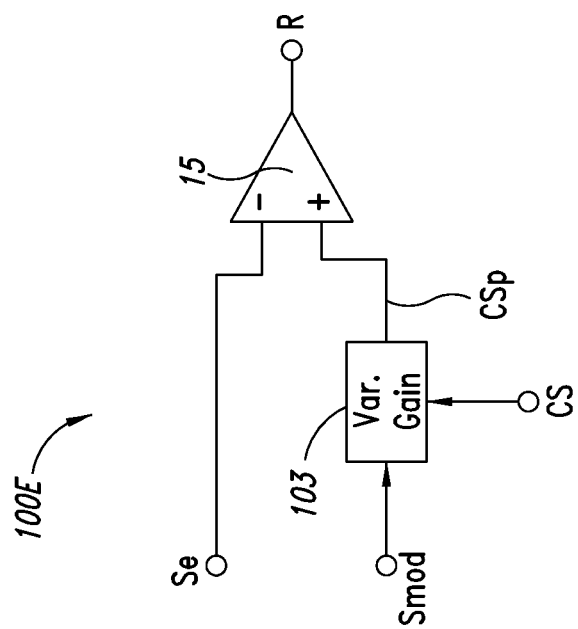

FIG. 10A shows a control device of the switching frequency of a switching converter according to the third embodiment of the disclosure wherein this adjustment is not necessary. In fact the modulator 100E comprises a variable gain block 103 having inputs that receive the modulating signal Smod and the signal CS; the signal Smod is fed to the control input of the block 103. This block 103 provides the signal CSp at its output (fed to the non-inverting input of the PWM comparator 15) that is proportional to the CS. The proportionality constant is changed by the control input and, then, by the modulating signal Smod. FIG. 10B shows the time diagrams of the signals Smod, CS, CSp, Q and the gain G of the block 103 for the exemplary case of a square wave modulating signal.

The variable gain block 103 can be performed in many ways. Gains less than unity are acceptable; hence, it is possible to have very simple implementations.

Figure 11:
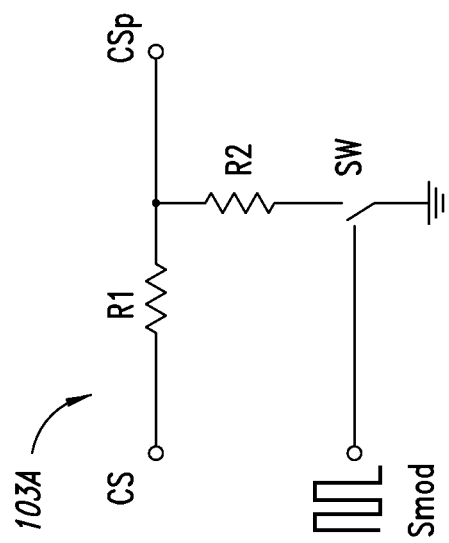
FIG. 11 shows one implementation of the variable gain block of the control device in FIG. 10.

FIG. 11 shows a variable gain block 103A according to one of the possible implementations of the block 103. The signal CSp can be equal to CS or attenuated by a factor R2/(R1+R2) depending on whether the switch SW is open or closed to form a resistor divider. This switch is controlled by the square wave modulating signal Smod. This functionality generates waveforms shown in FIG. 10B and might be referred to more as a "frequency hopping" rather than a "frequency modulation".

The peak primary current Ipkp is changed periodically between two different values whose ratio is constant and equal to the gain CSp/CS=R2/(R1+R2). As the output load of the converter is reduced, so that the average value of Ipkp gets smaller and smaller, also the difference between the two values will be reduced proportionally and tend to zero as the load tends to zero.

Figure 12:
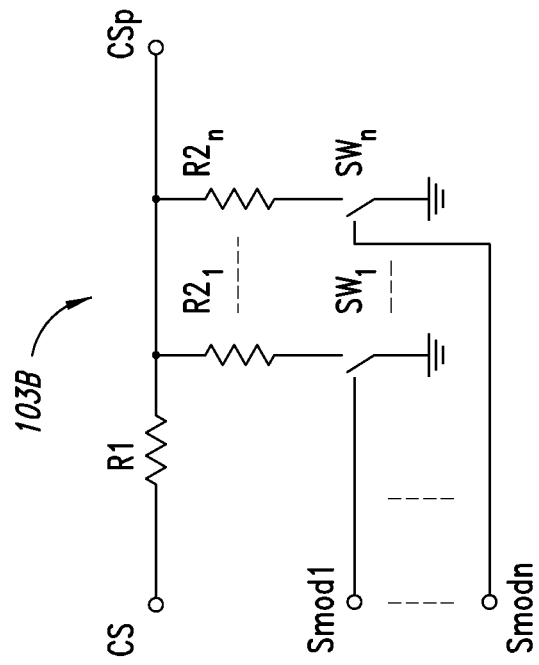
FIG. 12 shows another implementation of the variable gain block of the control device in FIG. 10.

The functionality of the circuit 103A in FIG. 11 can be generalized as shown in the circuit 103B in FIG. 12. In this circuit 103B there is one pass resistor R1 that connects CS to CSp and n branches composed of a resistor $R2_1 \ldots R2_n$ and a series switch $SW_1 \ldots SW_n$. Each switch is driven by its own modulating signal Smod1 ... Smodn, in this case a square wave signal. In this way the resistor divider can have $2^n$ possible configurations and the gain can assume $2^n$ possible values. The way in which these values alternate in time depends on the frequency and duty cycle of the square wave modulating signals.

Figure 13A:
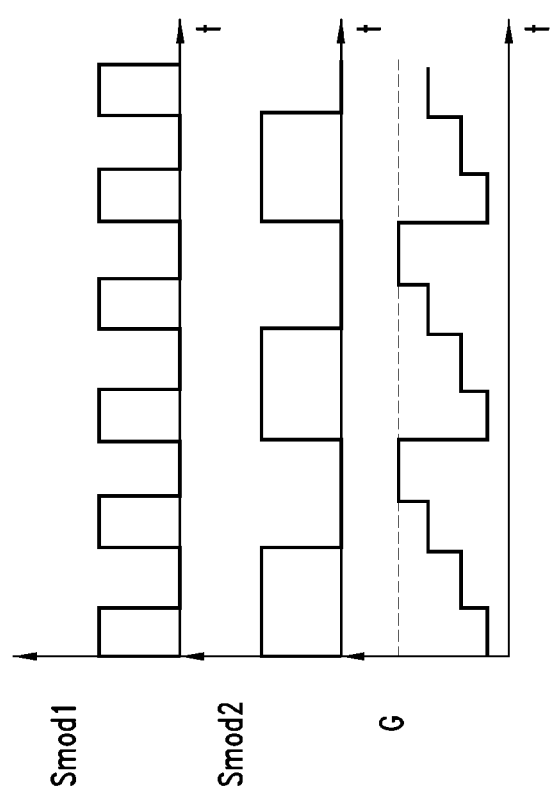
FIG. 13 shows time diagrams of signals in play in the variable gain block in FIG. 12.
Figure 13B:
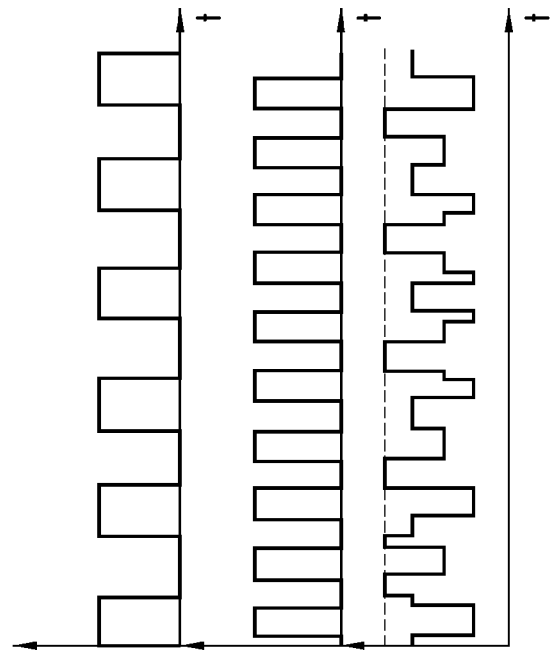

FIGS. 13A, 13B illustrates two examples of timing diagrams relevant to the circuit of FIG. 12 with n=2, so that the gain G can assume four possible values.

In the timing diagram of FIG. 13A, the two square waves Smod1 and Smod2 are correlated: the modulating signal Smod2 is derived from the modulating signal Smod1 by frequency division (e.g., with a T-type flip-flop). The resulting pattern for the gain is a staircase that resembles a sawtooth at the frequency of the modulating signal Smod2.

In the timing diagram 13B, the two square waves Smod1 and Smod2 are uncorrelated: although they have the same duty cycle, they have different frequencies so that their mutual phase continuously shifts in time. As a result, the resulting pattern for the gain G has a random appearance.

Note that in the previously considered cases a square wave modulating voltage was assumed for the sake of simplicity but any modulating waveform could be used in principle. In the circuits of FIGS. 11 and 12, instead, a square wave modulating voltage must be used. The duty cycle of this square wave need not to be 50% and may be subjected to optimization.

However, other implementations of the variable gain block 103 are possible where a square wave voltage is not mandatory.

Figure 14B:
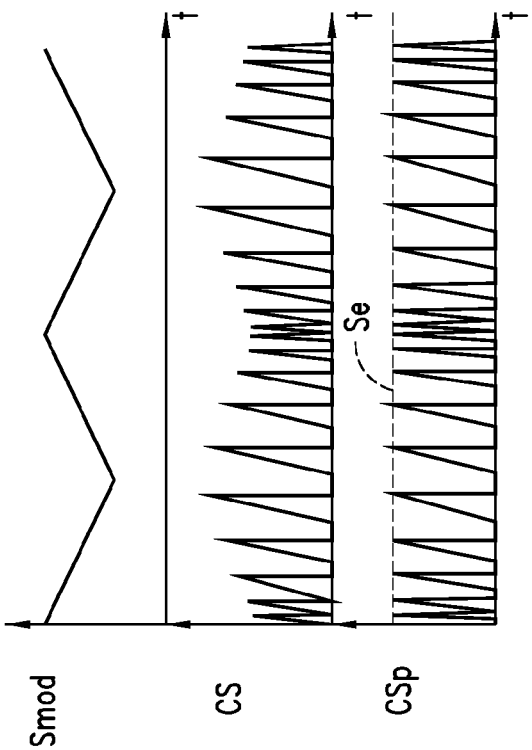
FIG. 14 shows another implementation of the variable gain block of the control device in FIG. 10 along with the time diagram of some signals in play.
Figure 14A:
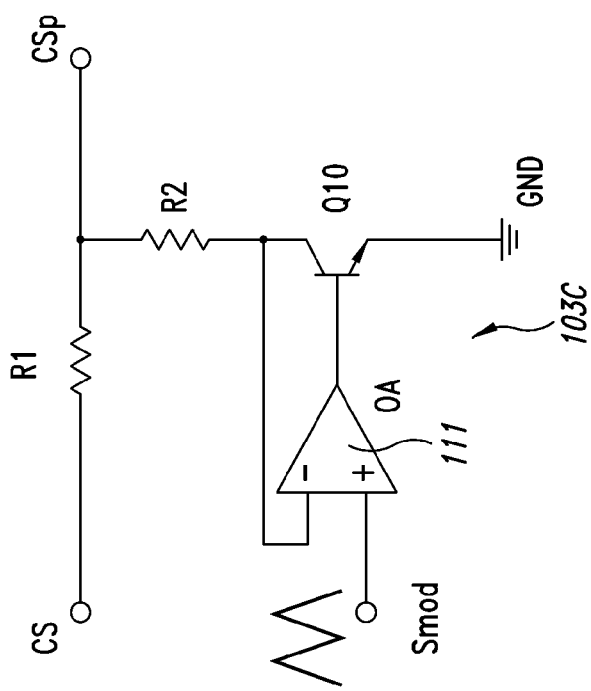

Another type of implementation 103C of the block 103 is shown in FIG. 14, along with its waveform signals. The modulating signal Smod is a triangular modulating voltage but any other shape could be used as well. The block 103C comprises a operational amplifier 111 having the non-inverting input connected to the signal Smod and the inverting input connected to the emitter terminal of a pnp bipolar transistor Q having the base terminal connected to the output terminal of a the operational amplifier 111 and the collector terminal connected to ground GND. The emitter terminal is connected to the signal CS by the resistances R1 and R2 arranged in series and at the common terminal of the series is provided the signal CSp.

Assuming that the modulating signal Smod is such that Q works either in the cutoff or in the active region, the circuit has the following input-to-output transfer function:

$$CSp(t) = \begin{cases} CS(t) & \text{if } CS(t) \leq S \, mod(t) \\ \frac{R2}{R1+R2}CS(t) + \frac{R1}{R1+R2}S \, mod(t) & \text{if } CS(t) > S \, mod(t), \end{cases}$$

Though there is not an input-to-output proportionality relationship as in the circuits of FIGS. 11 and 12, also with this circuit as the output load of the converter tends to zero (i.e., the peak of CS(t) tends to zero) the modulation disappears and the gain is 1 (CSp=CS).

As already mentioned, the control devices disclosed so far are applicable to TM boost PFC pre-regulators as well. The specificity of these converters can originate embodiments that slightly differ from those considered in QR flyback converters. As an example, it is possible to consider the case of a current-mode controlled TM (transition mode) boost PFC pre-regulator.

Figure 15:
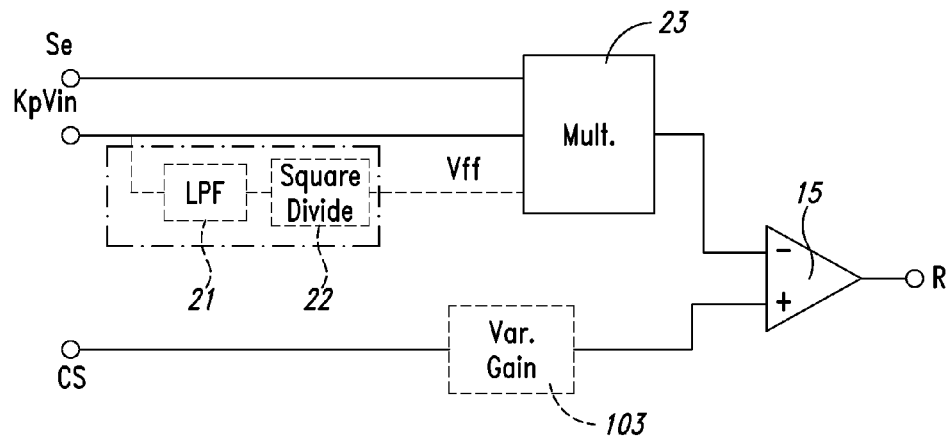
FIG. 15 shows the control core of a current-mode controlled TM boost pre-regulator according to the present disclosure.

FIG. 15 illustrates the control core of such type of converter. The basic structure is similar to that shown in FIG. 5 for a QR flyback converter: the difference is in the reference voltage for the peak current provided to the inverting input of the PWM comparator 15. Instead of the output Se of the error amplifier, here it is the output of an analog multiplier 23 that receives at its inputs a portion of the instantaneous input voltage Kp·Vin (Kp is a scaling factor), the output Se of the error amplifier 14 and, optionally, the voltage feedforward input Vff when the loop gain is desired to be independent of the input voltage. Vff is a dc voltage generated from the voltage Vin via a low-pass filter 21 and a cascaded squarer-divider block 22 whose output is the reciprocal of the squared input.

With this control core the peak inductor current in a switching cycle is:

$$Ipkp = \frac{1}{Rs} Km \frac{KpVinSe}{Vff^2},$$

where Km is the multiplier gain. The modulating signal can act on any of the terms in the preceding equation.

As in the preceding embodiments and variants thereof, the modulating signal Smod, Smod1 . . . Smodn may be added to the signal Se, to the signal CS or may be at the input of the variable gain block 103. The gain of the multiplier 23 may be modulated by the signal Smod, as alternative. Also as alternative, the signal Smod may be added to the signal KpVin or to the signal Vff or to the output signal of the multiplier 23.

The modulating signal Smod, Smod1 . . . Smodn appearing in any of the previously considered embodiments is typically realized with an oscillator. This can be realized with any prior art configuration relevant to the desired wave shape.

It is worth highlighting that, in the case of a square wave modulating signal Smod, Smod1 . . . Smodn, a dedicated oscillator is not necessary: it is possible to derive the modulating signal from the PWM pulse train generated by the control core itself. This can be done with both voltage-mode and current-mode control.

Figure 16:
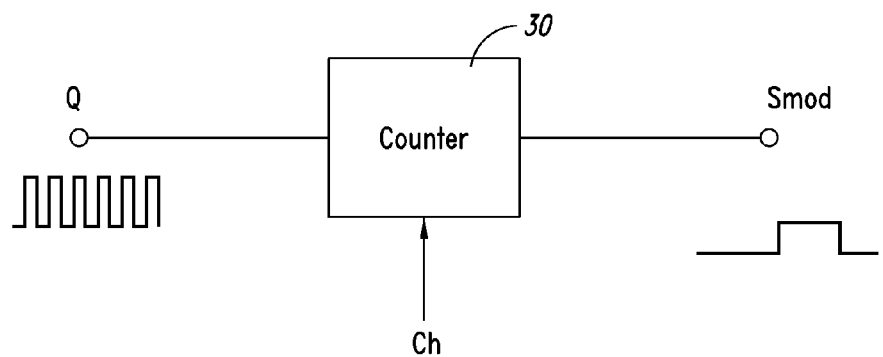
FIG. 16 shows a possible way to generate a square wave modulating signal without using a dedicated oscillator, by frequency division of the PWM pulse train.

A simple example of this realization is shown in FIG. 16. The output signal Q of the PWM latch 17 is fed into the input of a mod-n counter 30; hence, its output Smod will be a square wave with a frequency equal to 1/n of the switching frequency. Of course any other pulse signal in the control core could be used as the input for the counter (e.g., the set and reset signals for the PWM latch, etc.). The counter can be provided with an additional control input Ch that changes the end-of-count (n). This feature could be used, for example, to adapt the resulting modulation frequency to the switching frequency or to have a time-varying modulation frequency.

Figure 17:
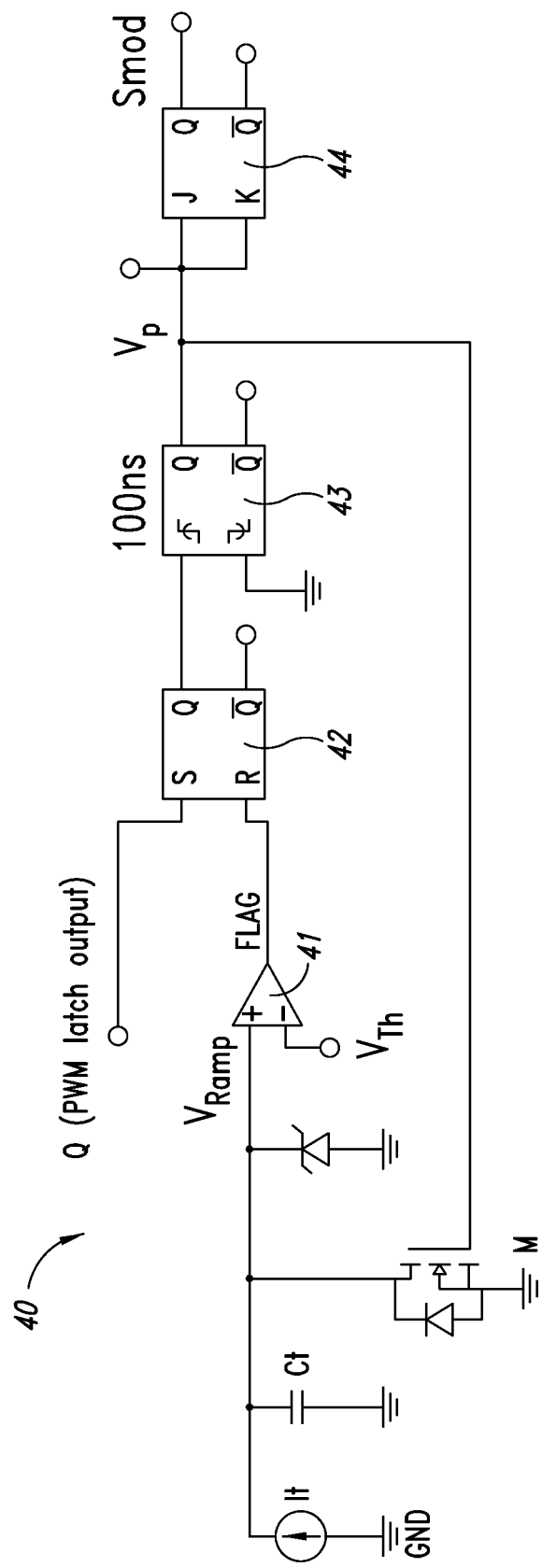
FIG. 17 shows another possible implementation of a generator of a square wave modulating signal.

FIG. 17 illustrates a possible circuit 40 that generates a square wave modulating signal Smod having a minimum duration of the HIGH and LOW levels ($T_{HIGH}$ and $T_{LOW}$) equal to a pre-defined time. As a result, the number of switching cycles at a given frequency is not fixed but depends on the operating frequency of the converter. With respect to the one in FIG. 16, this circuit 40 provides a duty cycle of the modulated current closer to 50%. The modulating signal obtained by this circuit 40 can be used in each of the circuits in Figures from 5 to 10, applicable to the QR flyback converters of FIGS. 1 and 3, as well as to the TM boost PFC pre-regulator control core in FIG. 15.

When the voltage ramp $V_{Ramp}$ across the timing capacitor Ct exceeds the threshold $V_{Th}$, a comparator 41 sets at the high level the output signal FLAG and resets the SR flip-flop 42 having at the set input S the output signal Q of the flip-flop 17. The output Q* of the flip-flop 42 is set high at the first rising edge of the output Q of the PWM latch 17 which occurs after the above mentioned reset.

The signal Q*, in turn, generates a 100 ns pulse $V_P$ by means of the monostable device 43; the pulse signal $V_P$ discharges the capacitor Ct through a MOSFET transistor M and toggles the output of the JK flip-flop 44, obtaining in this way the modulating signal Smod.

Figure 18:
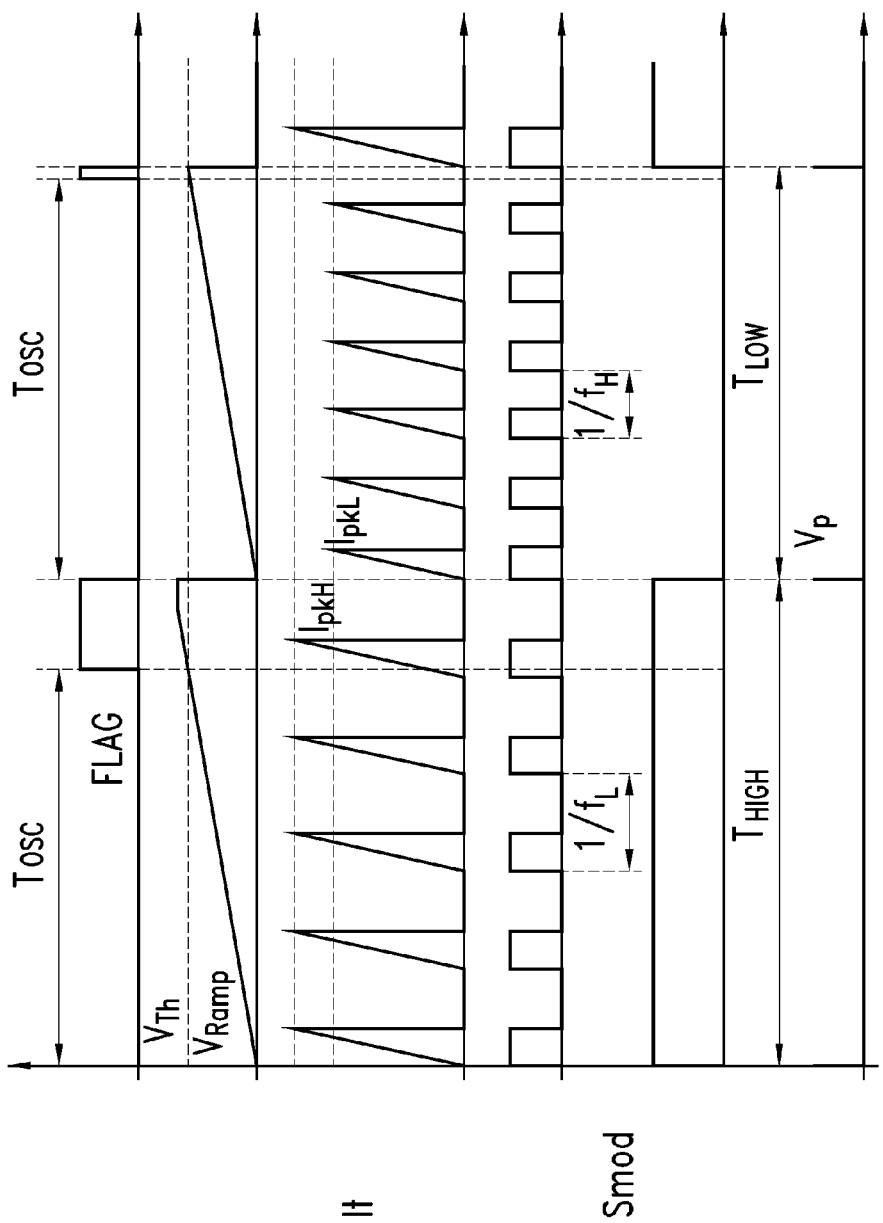
FIG. 18 shows time diagrams in play in the circuit of FIG. 17.

FIG. 18 shows the time diagrams of the signal FLAG (which is null for the time Tosc), the signal $V_{Ramp}$, The signal It with the peak $I_{pkH}$ and $I_{pkL}$, the signal Q with frequency $1/f_L$ and $1/f_H$, the signal Smod and the signal $V_P$.

The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A control device for controlling a quasi-resonant switching power converter configured to convert an input voltage to a DC output voltage and deliver an output current, said power converter including a power switch and a magnetic device, said control device comprising:
- a demagnetization detector configured to detect demagnetization of the magnetic device and synchronize a time instant at which said power switch is turned on to the detection of said magnetic device demagnetization;
- a control loop configured to regulate at least one of the DC output voltage and output current by controlling a control variable, that determines a time instant at which said power switch is turned off;
- a signal generator configured to produce a modulating signal having a frequency larger than a closed-loop bandwidth of said control loop and lower than a switching frequency of the power switch; and
- a modulator configured to receive the modulating signal and change the turn-off instant at which the power switch is turned off with respect to the time instant determined by the control loop, the modulator being configured to change the turn-off instant at a rate corresponding to a frequency larger than the closed-loop bandwidth of said control loop and lower than the switching frequency of the power switch by changing said control variable as a function of said modulating signal.

2. The control device according to claim 1, wherein said control variable is an on time period of the power switch of the power converter.

3. The control device according to claim 2, comprising an error amplifier configured to receive the feedback signal deriving from the output signal of the power converter and provide the signal related to the feedback signal by determining a difference between the feedback signal and a reference signal.

4. The control device according to claim 1, wherein said control variable is a peak current value of a current through the power switch of the power converter.

5. The control device according to claim 4, wherein the ramp generator is configured to produce the ramp signal from a sensing of the current flowing through the power switch, said modulator is configured to modify an amplitude of the ramp signal based on the modulating signal, and said modulator includes a variable gain circuit configured to receive the ramp signal and the modulating signal and periodically change a gain of the variable gain circuit based on the modulating signal.

6. The control device according to claim 5, wherein the variable gain circuit is configured to receive a plurality of modulating signals and change the gain of the variable gain circuit based on the plurality of modulating signals.

7. The control device according to claim 6, wherein the variable gain circuit comprises a resistive divider that includes:
- a first resistance configured to receive the ramp signal;
- a plurality of second resistances coupled to the first resistance; and
- a plurality of switches respectively coupled to the second resistances, said switches being configured to be controlled by said plurality of modulating signals, respectively.

8. The control device according to claim 5, wherein said variable gain circuit comprises a resistive divider that includes:
- a first resistance configured to receive the ramp signal;
- a second resistance coupled to the first resistance;
- a switch coupled with the second resistance between the first resistance and a ground terminal; and
- an operational amplifier having a first input configured to receive the modulating signal, a second input coupled to a node between the switch and the second resistance, and an output coupled to a control terminal of the switch.

9. The control device according to claim 5, wherein said variable gain circuit comprises a resistive divider that includes:
- a first resistance configured to receive the ramp signal;
- a second resistance coupled to the first resistance; and
- a switch coupled with the second resistance between the first resistance and a ground terminal, the switch being configured to be controlled by the modulating signal.

10. The control device according to claim 1, wherein the control loop includes:
- an error amplifier configured to receive a feedback signal corresponding to the output voltage and provide an error signal representative of a difference between the feedback signal and a reference signal;
- a PWM comparator having n input and an output, the input being coupled to an output of the error amplifier; and
- a set-reset flip-flop having an input coupled to an output of the PWM comparator and configured to provide a square wave signal, said modulator being configured to derive the modulating signal from said square wave signal.

11. The control device according to claim 10, wherein said modulator is configured to generate the modulating signal as a square wave having a prefixed duration of a high level and a low level.

12. The control device according to claim 1, comprising:
- a ramp generator configured to produce a ramp signal, wherein:
  - said control circuit includes a PWM comparator configured to compare the ramp signal with a signal related to a feedback signal deriving from the output voltage of the power converter,
  - said modulator is configured to receive the ramp signal and perform at least one of:
    - changing a slope of the ramp signal based on the modulating signal,
    - modifying an amplitude of the ramp signal based on the modulating signal, and
    - adding the modulating signal to one of the ramp signal and the signal related to the feedback signal.

13. The control device according to claim 12, wherein said modulator is configured to change periodically the slope of said ramp signal.

14. The control device according to claim 12, wherein said modulator is configured to add the modulating signal to said signal related to the feedback signal.

15. The control device according to claim 12, wherein the ramp generator is configured to produce the ramp signal from a sensing of a current flowing through the power switch, and said modulator is configured to add the modulating signal to one of the ramp signal and the signal related to the feedback signal.

16. A quasi-resonant switching power converter for converting an input signal to a DC output voltage and deliver an output current, said power converter comprising:
- an input terminal configured to receive the input signal;
- an output terminal configured to provide the DC output voltage;
- a power switch coupled to said input terminal and configured to regulate said DC output signal;
- a magnetic device; and
- a control device that includes:
  - a demagnetization detector configured to detect demagnetization of the magnetic device and synchronize a time instant at which said power switch is turned on to the detection of said magnetic device demagnetization;

a control loop configured to regulate at least one of the DC output voltage and output current by controlling a control variable that determines a time instant at which said power switch is turned off;

a signal generator configured to produce a modulating signal having a frequency larger than a closed-loop bandwidth of said control loop and lower than a switching frequency of the power switch; and the modulating signal and change the turn-off instant at which the power switch is turned off with respect to the time instant determined by the control loop, the modulator being configured to change the turn-off instant at a rate corresponding to a frequency larger than the closed-loop bandwidth of said control loop and lower than the switching frequency of the power switch by changing said control variable as a function of said modulating signal.

17. The power converter according to claim 16, wherein the control device includes:
a ramp generator configured to produce a ramp signal, wherein:
said control circuit includes a PWM comparator configured to compare the ramp signal with a signal related to a feedback signal deriving from the output voltage of the power converter,
said modulator is configured to receive the ramp signal and perform at least one of:
changing a slope of the ramp signal based on the modulating signal,
modifying an amplitude of the ramp signal based on the modulating signal, and
adding the modulating signal to one of the ramp signal and the signal related to the feedback signal.

18. The power converter according to claim 17, wherein the ramp generator is configured to produce the ramp signal from a sensing of a current flowing through the power switch, said modulator is configured to modify an amplitude of the ramp signal based on the modulating signal, and said modulator includes a variable gain circuit configured to receive the ramp signal and the modulating signal and periodically change a gain of the variable gain circuit based on the modulating signal.

19. The power converter according to claim 18, wherein the variable gain circuit is configured to receive a plurality of modulating signals and change the gain of the variable gain circuit based on the plurality of modulating signals.

20. The power converter according to claim 19, wherein the variable gain circuit comprises a resistive divider that includes:
a first resistance configured to receive the ramp signal;
a plurality of second resistances coupled to the first resistance; and
a plurality of switches respectively coupled to the second resistances, said switches being configured to be controlled by said plurality of modulating signals, respectively.

21. The power converter according to claim 18, wherein said variable gain circuit comprises a resistive divider that includes:
a first resistance configured to receive the ramp signal;
a second resistance coupled to the first resistance;
a switch coupled with the second resistance between the first resistance and a ground terminal; and an operational amplifier having a first input configured to receive the modulating signal, a second input coupled to a node between the switch and the second resistance, and an output coupled to a control terminal of the switch.

22. The power converter according to claim 18, wherein said variable gain circuit comprises a resistive divider that includes:
a first resistance configured to receive the ramp signal;
a second resistance coupled to the first resistance; and
a switch coupled with the second resistance between the first resistance and a ground terminal, the switch being configured to be controlled by the modulating signal.

23. A method, comprising:
controlling a quasi-resonant switching power converter and causing said power converter to convert an input signal to a DC output voltage and deliver an output current, said power converter including a power switch and a magnetic storage element, said controlling including:
detecting demagnetization of the magnetic device and synchronizing a time instant at which said power switch is turned on to the detection of said magnetic device demagnetization;
regulating, using a control loop, at least one of the DC output voltage and output current by controlling a control variable that determines a time instant at which said power switch is turned off;
producing a modulating signal having a frequency lamer than a closed-loop bandwidth of said control loop and lower than a switching frequency of the power switch;
change the turn-off instant at which the power switch is turned off
changing the turn-off instant at which the power switch is turned off with respect to the time instant determined by the control loop, the changing including changing the turn-off instant at a rate corresponding to a frequency larger than the closed-loop bandwidth of said control loop and lower than the switching frequency of the power switch by changing said control variable as a function of said modulating signal.

24. The control method according to claim 23, wherein said control variable is an on time period of the power switch.

25. The control method according to claim 23, wherein said control variable is a peak current value of a current passing through the power switch.

26. The control method according to claim 23, comprising:
generating a ramp signal; and
comparing the ramp signal with a signal related to a feedback signal corresponding to the output voltage of the power converter, the modulating including receiving the ramp signal at a modulator and performing at least one of:
changing a slope of the ramp signal based on the modulating signal,
modifying an amplitude of the ramp signal based on the modulating signal, and
adding the modulating signal to one of the ramp signal and the signal related to the feedback signal.

27. The control method according to claim 26, wherein said modulating includes changing the slope of said ramp signal.

28. The control method according to claim 26, wherein said modulating includes adding the modulating signal to said signal related to the feedback signal.

29. The control method according to claim 26, wherein said modulating includes adding the modulating signal to one of said ramp signal and said signal related to the feedback signal.

* * * * *